United States Patent
Alkhowaildi et al.

(10) Patent No.: US 12,281,556 B2
(45) Date of Patent: Apr. 22, 2025

(54) POND WATER (GAS PLANT DISCHARGE) BASED FRACTURING FLUID

(71) Applicant: SAUDI ARABIAN OIL COMPANY, Dhahran (SA)

(72) Inventors: Mustafa Alkhowaildi, Dhahran (SA); Saad Hejji Al-Ruwayshid, Dhahran (SA); Fahd Ibrahim Alghunaimi, Khobar (SA); Norah W. Aljuryyed, Dhahran (SA); Arif Al-Zawwadi, Dhahran (SA); Mohammed Abdullah Bataweel, Dhahran (SA); Eyad Ali Alali, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/193,355

(22) Filed: Mar. 30, 2023

(65) Prior Publication Data
US 2024/0328294 A1    Oct. 3, 2024

(51) Int. Cl.
*E21B 43/26* (2006.01)
*B01D 53/26* (2006.01)
(Continued)

(52) U.S. Cl.
CPC .......... *E21B 43/2607* (2020.05); *B01D 53/26* (2013.01); *B01F 35/83* (2022.01);
(Continued)

(58) Field of Classification Search
CPC ..... E21B 43/26; E21B 43/2607; B01D 53/26; B01D 2256/245; B01F 35/83; B01F 2101/49
See application file for complete search history.

(56) References Cited

U.S. PATENT DOCUMENTS

| 8,162,048 B2 * | 4/2012 | Termine | E21B 43/26 166/308.1 |
| 9,670,080 B2 | 6/2017 | Seth | |

(Continued)

FOREIGN PATENT DOCUMENTS

| CN | 104891720 A | 9/2015 |
| CN | 106336862 A | 1/2017 |

OTHER PUBLICATIONS

Burnett et al., "Achieving Water Quality Required for Fracturing Gas Shales: Cost Effective Analytic and Treatment Technologies," Society of Petroleum Engineers, SPE-173717-MS, Paper presented at the SPE International Symposium on Oilfield Chemistry, The Woodlands, Texas, USA, Apr. 2015, 17 pages.

(Continued)

*Primary Examiner* — Matthew R Buck
(74) *Attorney, Agent, or Firm* — Osha Bergman Watanabe & Burton LLP

(57) ABSTRACT

Systems to produce a pond water, pond water compositions, and methods for using pond water compositions are provided. The system may include a rainwater collection system, a water purification system, a condensate collection system, and a mixing tank configured to receive and mix the various water sources to form a pond water. A system for forming a fracturing fluid is provided, wherein the system may include the system for producing a pond water, an additive feed system, and a mixer configured to receive and mix pond water from the mixing tank with one or more additives from the additive feed system to produce a frac fluid. A method of fracturing a well is also provided, which may include producing a pond water, mixing the pond water with one or more additives to form a frac fluid, and pumping the frac fluid downhole to fracture the well.

16 Claims, 1 Drawing Sheet

(51) Int. Cl.
    *B01F 35/83*       (2022.01)
    *B01F 101/49*    (2022.01)

(52) U.S. Cl.
    CPC .. *B01D 2256/245* (2013.01); *B01D 2257/102* (2013.01); *B01D 2257/80* (2013.01); *B01F 2101/49* (2022.01)

(56) References Cited

U.S. PATENT DOCUMENTS

| | | | |
|---|---|---|---|
| 10,240,445 B2 * | 3/2019 | Ido | C09K 8/725 |
| 10,967,303 B2 | 4/2021 | Romers | |
| 2014/0286854 A1 | 9/2014 | Keister | |
| 2016/0052814 A1 * | 2/2016 | Leyendecker | E21B 21/068 210/257.1 |
| 2016/0230082 A1 * | 8/2016 | McMahon | C09K 8/685 |
| 2023/0076219 A1 * | 3/2023 | Fleckenstein | F03G 4/001 |

OTHER PUBLICATIONS

Li et al., "High-TDS Produced Water-Based, Low-Damaging Fracturing Fluids for Applications at 300° F. or Higher," Society of Petroleum Engineers, SPE-191749-MS, Paper presented at the SPE Annual Technical Conference and Exhibition, Dallas, Texas, USA, Sep. 2018, 13 pages.

Saini et al., "Potential Use of Oil-Field Produced Water as Base Fluid for Hydraulic Fracturing Operations: Effect of Water Chemistry on Crosslinking and Breaking Behaviors of Guar Gum-Based Fracturing Fluid Formulations," Society of Petroleum Engineers, SPE-185693-MS, Paper presented at the SPE Western Regional Meeting, Bakersfield, California, Apr. 2017, 11 pages.

* cited by examiner

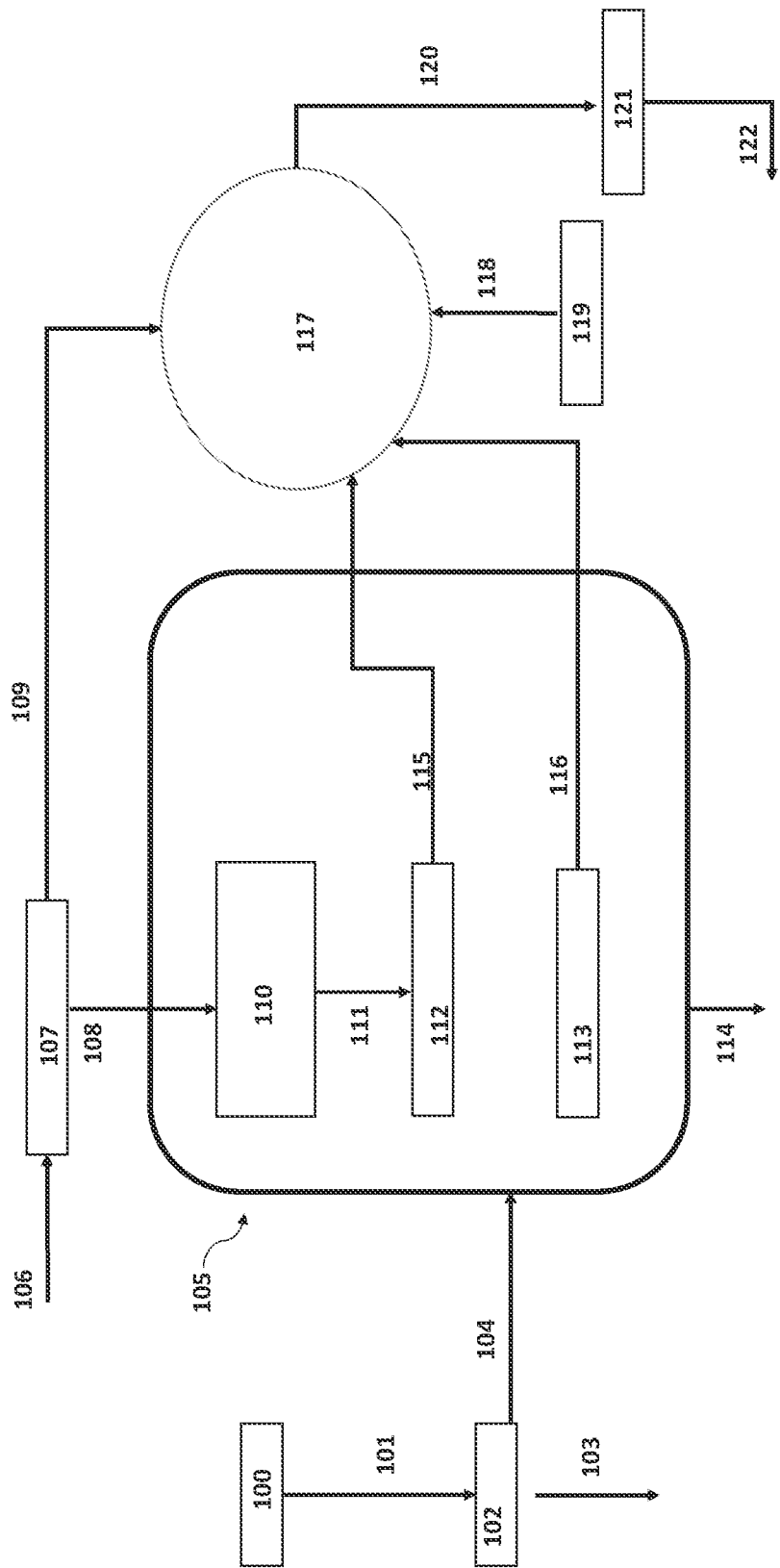

POND WATER (GAS PLANT DISCHARGE) BASED FRACTURING FLUID

BACKGROUND

Hydraulic fracturing is commonly used to recover hydrocarbon resources such as oil and natural gas that are trapped in tight reservoirs below ground. Fracturing fluids are mainly made up of water, with specific additives to help facilitate oil and gas recovery. An average fracturing fluid contains about 85% water, 14% proppant, and 1% other chemicals. Although they are mainly made up of water, fracturing fluid development is an art which requires the use of special additives to control physical and chemical properties of the fluid that allow it to be successfully used to facilitate the recovery of hydrocarbons from the wellbore.

Freshwater is often used to formulate hydraulic fracturing fluids, and the demand is increasing continuously. This poses a risk to consuming large amounts of what could be drinking water.

As described in US2016/0230082, service and production companies have looked to other sources of water, such as wastewater and seawater, to produce fracturing fluids. However, these less ideal sources of water must be heavily treated to be suitable for use in a fracturing fluid. Control of pH, reduction of dissolved solids, and removal of impurities are among some of the costly treatments that water sources other than freshwater must undergo before being used as a fracturing fluid.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for producing a pond water that may include a rainwater collection system, a water purification system, a natural gas processing system with a boiler, one or more energy conversion systems, and a condensate collection system. The system also includes a mixing tank configured to receive and mix rainwater from the rainwater collection system, reject water from the water purification system, and condensate from the condensate collection system to form a pond water.

In a further aspect, embodiments disclosed herein relate to a system for forming a frac fluid which may include the system for producing a pond water, an additive feed system, and a mixer configured to receive and mix pond water from the mixing tank with one or more additives from the additive feed system to produce a frac fluid.

In another aspect, embodiments disclosed herein relate to a method for producing a pond water. The method may include capturing rainwater, purifying a source water and recovering a purified water and a reject water, boiling the purified water to produce steam, condensing the steam in one or more energy conversion units to produce condensate, collecting the condensate from the one or more energy conversion units to form a mixed condensate, and mixing the rainwater, the mixed condensate and the reject water to produce a pond water.

In another aspect, embodiments disclosed herein relate to a method of fracturing a well, which may include producing a pond water, mixing the pond water with one or more additives to form a frac fluid, and pumping the frac fluid downhole to fracture the well.

Other aspects and advantages of the claimed subject matter will be apparent from the following description and the appended claims.

BRIEF DESCRIPTION OF DRAWINGS

The FIGURE is a flowchart depicting a method for collecting water sources to form a pond water and pond water based fracturing fluids according to embodiments herein.

DETAILED DESCRIPTION

Embodiments herein are directed toward systems and methods for producing a mixed wastewater, termed "pond water" herein, and for use of that pond water in a fracturing fluid. Systems and methods for producing a pond water herein include recovering waters from multiple sources. Embodiments herein further include using the resulting pond water in a fracturing fluid to reduce the amount of freshwater that is used in the hydraulic fracturing process by using water that would otherwise be disposed.

Several steps in the natural gas refining process produce water as a by-product. This water is typically discharged into an evaporation pool and is largely either disposed of or allowed to evaporate into the atmosphere as industry does not deem it suitable for re-use opportunities. The present methods and systems advantageously re-use said discharged water, with minimal treatment, in applications such as hydraulic fracturing.

Various wastewater streams are recovered and mixed to form pond waters according to embodiments herein. Embodiments herein recover wastewaters from each of a natural gas processing system, a water purification system, and a rainwater collection system. Other optional wastewaters may also be used. These wastewaters may then be mixed to form pond waters according to embodiments herein. The resulting pond water may then be supplied to systems used in formulating a fracturing fluid used in a hydraulic fracturing process.

Wastewaters from a natural gas processing system useful in formulating pond waters according to embodiments herein may include one or more of produced waters, process waters, and condensate (utility discharge waters). While numerous systems of differing configurations known in the art are used to purify, pressurize, and condense a raw natural gas into desired products (such as liquid natural gas (LNG) and compressed natural gas (NG), among other products), each of these natural gas processing systems generate wastewaters by removing water from the produced fluids and the raw natural gas. These natural gas processing systems also generate wastewaters, primarily in the form of condensate, resulting from the use of steam to drive turbines, as a heating fluid to provide heat to one or more heat exchangers, and other utility uses within the natural gas processing system.

Each of these natural gas processing wastewaters, both from the process side and the utility side of the natural gas processing system, may be collectively or individually accumulated, or a combination of collective and individual accumulation, and supplied for mixing to form pond waters according to embodiments herein. For example, produced and process waters may be collectively accumulated and supplied while the condensate may be recovered and supplied by a separate system, such as a condensate collection system. As another example, each of the produced, process and utility wastewaters may be fed to a common collection system for subsequent supply to a pond water mixing system according to embodiments herein. In yet other embodiments, each of the produced, process and utility wastewaters may be fed directly to a pond water mixing system for combination with the rainwaters from the rainwater collection system(s) and waste (reject) waters from the water purification system(s) to form pond waters according to embodiments herein.

Natural gas processing may include separating and purifying crude natural gas from hydrocarbons, groundwater, and other impurities into a form that is suitable for use and deemed "pipeline quality." Most natural gas is trapped in underground rock formations and is recovered by drilling into said formations and, oftentimes, hydraulic fracturing is used to help further extract natural gas trapped in tight spaces within the wellbore by forcing hydraulic fracturing fluids down a well under high pressure. This process opens the rock formation, allowing natural gas to be released and flow up to the well's surface. After extraction, natural gas is referred to as wet natural gas because it usually contains other natural gas liquids, hydrocarbons, groundwater, and other non-hydrocarbon impurities (such as heavy metals and hydrogen sulfide). Several processing steps may be required to purify natural gas so that it is suitable for use by the consumer. A single stage separator located at the wellhead may be used to separate liquids from gases in recovered natural gas. A condensate separator may also be used at the wellhead to remove light liquid hydrocarbons from the natural gas stream. Natural gas separated at the wellhead may require further processing and is thus sent to a natural gas processing plant. Some common processes to purify natural gas include dehydration, contaminant removal, nitrogen extraction, methane separation, and fractionation. Dehydration is used to remove water from natural gas via either adsorption or adsorption. Contaminants such as hydrogen sulfide and carbon dioxide are often removed by passing the fluid stream through an amine solution. After hydrogen sulfide and carbon dioxide are reduced, the natural gas stream is sent to a nitrogen rejection unit which further dehydrates the stream using molecular sieve beds. Finally, fractionation uses boiler units to separate hydrocarbon gas liquids by their boiling points. The resulting purified natural gas stream and other products are then distributed to the end users or consumers.

Produced waters useful in embodiments herein may thus include water generated from a gas separator configured to separate a stream originating from one or more well sites and containing natural gas, water, and optionally heavier hydrocarbons to recover a raw natural gas stream. The gas separation process often occurs at or near the wellhead, where heavier hydrocarbons and free water are optionally removed in a conventional separator from the raw natural gas stream. The raw natural gas stream is then sent to the natural gas processing plant for further purification.

Process waters useful in embodiments herein may also include wastewater produced from processes that separate natural gas from impurities, water, and other hydrocarbons in a natural gas processing plant, including but not limited to dehydration, contaminant removal, nitrogen extraction, methane separation, and fractionation. For example, natural gas dehydration removes associated water from natural gas using adsorption, absorption, or condensation. The most widely used method for natural gas dehydration is absorption, where triethyleneglycol (TEG) is used as the sorbent to separate water from the natural gas stream. Adsorption is another method of natural gas dehydration, where a solid desiccant is used to adsorb water from the natural gas stream on a mole sieve, on a silica gel, or on alumina. The third common method for natural gas dehydration is condensation, where the natural gas stream is compressed and/or cooled to condense and remove water vapor from the stream. Condensation is used most often for simultaneous dehydration and recovery of NGLs, as other hydrocarbons can be recovered during this process as well. The resulting process waters from these wastewater streams, which is typically not re-used, is proposed herein to be used as a source of pond water.

Utility systems in natural gas processing plants also generate wastewaters, primarily in the form of condensate, resulting from the use of steam to drive turbines, as a heating fluid to provide heat to one or more heat exchangers, and other utility uses within the natural gas processing system. Industrial cooling towers continuously circulate fresh cooling water through equipment, such as heat exchangers and the like, that absorb heat during natural gas processing. Partial evaporation of cooling waters releases heat to the atmosphere and the lost cooling waters must be replaced with a makeup water source. Part of the circulating cooling water is also continuously discarded to prevent buildup of salts in the makeup water stream. Steam boilers in the natural gas processing system are used to produce heat for various separation and purification processes. As the steam provides heat to utilities within the plant, it cools down and naturally condenses to liquid form which is collected in a condensate drainage system. Condensate or utility discharge waters useful in embodiments herein may thus include condensed cooling tower water, water collected from a condensate drainage system, and the like.

As described above, pond water and systems producing pondwater according to embodiments herein receive reject water from a water purification system. Various water purification systems are known in the art and are used to produce a purified water stream from a ground water, brackish water, or sea water, among other source waters. These waters may be purified in these water purification systems to produce a purified water and a reject water. For example, filtration and ultrafiltration, membrane separation systems such as reverse osmosis and nanofiltration, water evaporation systems, freeze separation systems, ion exchange systems, and deaeration or degasification are each water purification systems that may produce reject water useful in embodiments herein.

In some embodiments, reject water useful in embodiments herein originates from a boiler feed water treatment that provides purified water to the boiler operation in a natural gas refining plant. The quality of water supplied to boilers is important because untreated water can cause scaling, reduce the lifetime of boiler tubes, and decrease boiler efficiency. Thus, a source of pond water described herein includes the reject water which is not of sufficient quality to be used in boilers in a natural gas processing plant.

Rainwater collection systems useful in embodiments herein may include rain barrels, ponds, or dry systems storing rainwater collected from buildings, such as those associated with or near the pond water system, artificial rain producing systems, as well as in-ground systems, wet systems, and aquifers. The rainwater collection system further comprises piping and pump(s) to transport harvested rainwater to other locations, such as to a mixing system for producing pond water according to embodiments herein.

The above described wastewaters may be combined to form pond waters according to embodiments herein. The system to produce the pond water further comprises a mixing system configured to receive and mix water from the various feed sources, including but not limited to rainwater from the rainwater collection system, reject water from the water purification system, produced waters, process waters, and condensate from the condensate collection system, to form a pond water. The mixing system may combine sources of pond water described above in an open holding system or systems, such as a pond or tank, or a closed tank system. The mixing system may include a series of pumps, flow lines and valves to bring each water stream to the mixing system. A tank or tanks intermediate to the mixing system may be used to pre-mix or combine one or more streams of the wastewaters prior to entering the mixing system. The mixing system may also contain an impeller or agitator to ensure uniform mixing of the pond water.

The system of one or more embodiments further comprises a control system configured to adjust the flow rate of one or more of the rainwater, the reject water, the condensate, the process water, and the produced water to maintain an appropriate concentration of dissolved solids in the pond water. Each of the above described wastewaters may include dissolved solids or other impurities. For example, reject water from a water purification system may include on average 30,000-50,000 mg/L salts such as sodium, potassium, calcium and barium salts. As another example, condensate may also include an amount of dissolved solids, such as a low concentration of metals resulting from the small solubility of metals in high pressure steam, or breakdown of the piping and vessels from normal use of the steam system. Pond waters according to embodiments herein may desirably have a TDS of about 5 ppm to about 5000 ppm and sulfates of 5 ppm to 500 ppm. Therefore, embodiments herein may also include a control system to provide appropriate mixing ratios of the various wastewaters to form acceptable pond waters for use as fracturing fluids. The control system may consist of hardware or software to control valve states, fluid levels, flow rates, and warning alarms. The mixing system may also include an additive or additives feed system or systems, which may also be controlled by the control system. Sensors, including a processor, memory, and an analog-to-digital converter for processing sensor measurements, may be used in combination with the control system to detect TDS levels of the wastewaters prior to entering the mixing system or during the mixing process or in the final pond water.

The additive system may comprise a volumetric additive feeder, a gravimetric additive feeder, an automatic closed loop control additive feeder, and the like. The additive system may be configured to provide an additive or additives to the pond water in order to produce a fluid having suitable physical and chemical properties to be used as a fracturing fluid. These additives may include a proppant, a gellant, an acid, a corrosion inhibitor, a friction reducer, a clay control, a crosslinker, a scale inhibitor, a breaker, an iron control, a gel stabilizer, and a biocide, among other additives commonly used in water-based fracturing fluids. Accordingly, systems herein may include one or more of a proppant feed system, a gellant feed system, an acid feed system, a corrosion inhibitor feed system, a friction reducer feed system, a clay control feed system, a crosslinker feed system, a scale inhibitor feed system, a breaker feed system, a gel stabilizer feed system, an iron control feed system, and a biocide feed system.

It has been found that the above-noted reject or wastewaters may be used to form a suitable fracturing fluid where the resulting pond water has a TDS in the range of 5 ppm to 5000 ppm and sulfates in the range of 5 ppm to 500 ppm to provide a stable linear and cross-linked gel. Further, a suitable fracturing fluid is defined as being able to maintain a suitable viscosity for proper proppant carry and to create desired fracture geometry at the temperature and pressure conditions experienced in the wellbore. Embodiments of pondwaters herein have values for TDS, sulfates, and other properties favorable for fracturing applications, providing for proper carry of proppants as well as preserving the ability of the fracturing fluids containing the pondwater to form stable linear and cross-linked gels.

As outlined above, various reject or wastewater sources may be mixed to form pondwaters useful for forming fracturing fluids according to embodiments herein. The streams from the respective sources may be mixed at appropriate ratios to provide a pondwater having a desirable TDS and other properties as noted above, and such ratios may include pond waters formed from up to 75 vol % condensate (boiler blowdown), up to 30 vol % produced waters, up to 30 vol % process waters, up to 20 vol % rainwater, and up to 15 vol % reject water. Pond water according to embodiments herein may include produced water from a lower limit of 1, 5, 10, 15, or 20 vol % to an upper limit of 5, 10, 15, 20, 25, or 30 vol %, where any lower limit may be combined with any mathematically compatible upper limit. Pond water according to embodiments herein may include rainwater, such as collected by a rainwater collection system, from a lower limit of 1, 5, 10, or 15 vol % to an upper limit of 5, 10, 15, or 20 vol %, where any lower limit may be combined with any mathematically compatible upper limit. Pond water according to embodiments herein may include process waters, such as from the dehydration of natural gas and other waters separated from a raw natural gas in a natural gas processing plant, from a lower limit of 1, 5, 10, 15, or 20 vol % to an upper limit of 5, 10, 15, 20, 25, or 30 vol %, where any lower limit may be combined with any mathematically compatible upper limit. Pond water according to embodiments herein may include condensate, such as recovered from boiler blowdown or other utility condensate streams in a natural gas processing plant, from a lower limit of 40, 45, 50, 55, 60, or 65 vol % to an upper limit of 55, 60, 65, 70, or 75 vol %, where any lower limit may be combined with any mathematically compatible upper limit. Pond water according to embodiments herein may include reject water, such as reject water from a water purification system used to supply purified water to a boiler of the natural gas processing plant, from a lower limit of 1, 3, 5, 7, or 10 vol % to an upper limit of 5, 7, 10, or 15 vol %, where any lower limit may be combined with any mathematically compatible upper limit.

Referring now to the FIGURE, a simplified block flow diagram of a system according to embodiments herein for producing a pond water and for producing a fracturing fluid using the pond water is illustrated. As illustrated in the FIGURE, a stream of hydrocarbons (101) is produced from an oil and gas well (100) and is sent to a gas separator (102) which separates raw natural gas (104) from produced water (103). The raw natural gas stream is sent to a natural gas processing plant (105) for further refinement, for example, dehydration (113) which separates process water (116) from the stream to form refined natural gas (114). In other processes within the natural gas processing plant, a boiler (110) uses purified water (108) to produce steam (111). The purified water is obtained from a source water (106) which undergoes a water purification process (107) to produce the purified water and a reject water (109) stream. The steam produced from the boiler in the natural gas processing plant enters other utility processes, such as heat exchangers (112) and may be collected as a condensate (115). Outside the natural gas processing plant, a stormwater collection system (119) collects rainwater (118) which is sent to a mixing tank (117) along with the process water (116), condensate (115), and reject water (109) streams. The mixing tank operates to produce a pond water (120) to which other additives may be mixed in (121) to produce a suitable hydraulic fracturing fluid (122). In some embodiments, a portion of the produced waters (103) may also be mixed with the other waters (109, 115, 116, 118) when forming the pond water and fracturing fluids.

As described above, embodiments herein provide for the accumulation and usage of various waste streams to produce a fracturing fluid. Embodiments of the present disclosure may advantageously utilize streams that are otherwise disposed of for the production of fracturing fluids, and thus may reduce or minimize the usage of freshwater resources for fracturing wellbores.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system for producing a pond water, comprising:
   a rainwater collection system configured to capture rainwater;
   a water purification system configured to receive and purify a source water to produce a purified water and a reject water;
   a natural gas processing system comprising:
      a boiler configured to receive and vaporize the purified water to produce steam;
      one or more energy conversion systems for converting the steam to condensate;
      a condensate collection system configured to receive condensate from each of the one or more energy conversion systems;
   a mixing tank configured to receive and mix the rainwater from the rainwater collection system, the reject water from the water purification system, and the condensate from the condensate collection system to form a pond water; and
   a control system coupled to the rainwater collection system, the water purification system, the natural gas processing system, and the mixing tank, wherein the control system is configured to adjust a flow rate of one or more of the rainwater, the reject water, the condensate, a process water, and a produced water to maintain a concentration of dissolved solids in the pond water in a range from about 5 ppm to about 5000 ppm.

2. The system of claim 1, wherein the natural gas processing system further comprises a dehydrator producing the process water, wherein the mixing tank is additionally configured to receive and mix the process water with each of the rainwater, the reject water, and the condensate to form the pond water.

3. The system of claim 2, further comprising a gas separator configured to separate a stream comprising at least natural gas and water to recover a raw natural gas stream and the produced water, wherein the mixing tank is additionally configured to receive and mix the produced water with each of the rainwater, the reject water, and the condensate to form the pond water.

4. The system of claim 1, wherein the rainwater collection system comprises one or more of rain barrels, ponds, or dry systems storing rainwater collected from buildings.

5. The system of claim 1, wherein the natural gas processing system comprises one or more process units configured to separate natural gas from impurities, water, and other hydrocarbons in a raw natural gas stream, the one or more process units including one or more of a dehydrator, a contaminant removal system, a nitrogen removal system, a methane separation system, and a fractionation unit.

6. The system of claim 1, wherein the one or more energy conversion systems of the natural gas processing system include one or more turbines, one or more heat exchangers, or both turbines and heat exchangers.

7. The system of claim 1, wherein the water purification system comprises one or more of filtration, ultrafiltration, a membrane separation system, a water evaporation systems, a freeze separation systems, an ion exchange systems, and a deaeration or degasification system.

8. A system for forming a frac fluid, the system comprising:
   the system for producing a pond water as claimed in claim 1;
   an additive feed system; and
   a mixer configured to receive and mix the pond water from the mixing tank with one or more additives from the additive feed system to produce a frac fluid.

9. The system of claim 8, wherein the additive feed system comprises one or more of a volumetric additive feeder, a gravimetric additive feeder, or an automatic closed loop control additive feeder.

10. The system of claim 8, wherein the one or more additive feed systems include one or more of a proppant feed system, a gellant feed system, an acid feed system, a corrosion inhibitor feed system, a friction reducer feed system, a clay control feed system, a crosslinker feed system, a scale inhibitor feed system, a breaker feed system, a gel stabilizer feed system, an iron control feed system, and a biocide feed system.

11. A method for producing a pond water, comprising:
   capturing rainwater using a rainwater collection system;
   purifying a source water using a water purification system, and recovering a purified water and a reject water;
   boiling the purified water using a boiler of a natural gas processing system to produce steam;
   condensing the steam in one or more energy conversion units of the natural gas processing system to produce condensate;
   collecting the condensate from the one or more energy conversion units using a condensate collection system of the natural gas processing system to form a mixed condensate;
   mixing the rainwater, the mixed condensate, and the reject water to produce a pond water in a mixing tank fluidly connected to the rainwater collection; and
   adjusting, using a control system coupled to the rainwater collection system, the water purification system, the natural gas processing system, and the mixing tank, a feed rate of one or more of the rainwater, the mixed condensate, the reject water, a process water, and a produced water to provide the pond water having a total dissolved solids content in a range from 5 ppmw to 5000 ppmw.

12. The method of claim 11, further comprising dehydrating a natural gas stream to recover the process water, wherein the mixing further comprises mixing the process water with the rainwater, the mixed condensate and the reject water to produce the pond water.

13. The method of claim 12, further comprising separating a produced fluid comprising at least natural gas and water to recover the produced water, wherein the mixing further comprises mixing the produced water with the rainwater, the mixed condensate and the reject water to produce the pond water.

14. The method of claim 11, wherein the pond water comprises:
    40-75 vol % mixed condensate;
    5-20 vol % produced water;
    5 to 25 vol % process water;
    1 to 15 vol % reject water; and
    5 to 15 vol % rainwater.

15. The method of claim 11, wherein the pond water comprises:
    50-70 vol % mixed condensate;
    5-20 vol % produced water;
    5 to 20 vol % process water;
    1 to 15 vol % reject water; and
    1 to 20 vol % rainwater.

16. A method of fracturing a well, comprising:
    producing a pond water as claimed in claim 11;
    mixing the pond water with one or more additives to form a frac fluid; and
    pumping the frac fluid downhole to fracture the well.

* * * * *